United States Patent
Sawada (10) Patent No.: US 8,059,804 B2
(45) Date of Patent: Nov. 15, 2011

(54) CONTROL PROGRAM PROVIDING METHOD USING COMMUNICATION SYSTEM, CENTER APPARATUS IN COMMUNICATION SYSTEM, USER APPARATUS IN COMMUNICATION SYSTEM, AND PROGRAM RECORDED ON RECORDING MEDIUM IN USER APPARATUS

(75) Inventor: Yoji Sawada, Toda (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/659,449

(22) Filed: Mar. 9, 2010

(65) Prior Publication Data

US 2010/0192200 A1    Jul. 29, 2010

Related U.S. Application Data

(62) Division of application No. 10/855,388, filed on May 28, 2004, now Pat. No. 7,801,291.

(30) Foreign Application Priority Data

May 30, 2003   (JP) .................................. 2003-155935

(51) Int. Cl.
*H04M 3/42* (2006.01)
(52) U.S. Cl. .............................. 379/201.03; 379/201.01
(58) Field of Classification Search ............ 379/201.01–201.03, 93.14; 700/90; 709/219
See application file for complete search history.

(56) References Cited

U.S. PATENT DOCUMENTS

| | | | |
|---|---|---|---|
| 4,747,127 A | 5/1988 | Hansen et al. | |
| 5,345,380 A | 9/1994 | Babson et al. | |
| 5,404,395 A | 4/1995 | Bogart et al. | |
| 5,455,853 A | 10/1995 | Cebulka et al. | |
| 6,421,717 B1 | 7/2002 | Kloba et al. | |
| 6,788,774 B1 | 9/2004 | Caldwell et al. | |
| 7,142,655 B2 | 11/2006 | Malinowski et al. | |
| 7,197,125 B1 | 3/2007 | Prasad et al. | |
| 2004/0071280 A1 | 4/2004 | Sandel et al. | |

FOREIGN PATENT DOCUMENTS

| | | |
|---|---|---|
| JP | 11-187120 | 7/1999 |
| JP | 2003-087422 | 3/2003 |
| JP | 2003-102040 | 4/2003 |
| JP | 2003-152874 | 5/2003 |

OTHER PUBLICATIONS

Decision to Grant a Patent, mailed by the Japanese Patent Office on Apr. 22, 2008, in corresponding Japanese Patent Application No. 2003-155935, and an English-language translation thereof.

*Primary Examiner* — William Deane, Jr.
(74) *Attorney, Agent, or Firm* — Finnegan, Henderson, Farabow, Garrett & Dunner, L.L.P.

(57) ABSTRACT

A method includes creating process data which constitutes at least a portion of the control program and describes the execution contents of the communication functions, and parameter data which constitutes a different portion of the control program from the process data portion and is used to describe individual setting information of user in accordance with the process data, in the center apparatus, sending the process data, and the parameter data from the center apparatus to the user apparatus via the communication network, receiving the process data and the parameter data from the center apparatus, then describing input individual setting information in the parameter data to create the control program, in the user apparatus, recording the resulting control program onto a recording medium, and reading the control program from the recording medium and setting the read control program in the communication equipment as requested by the user, in the user apparatus.

9 Claims, 13 Drawing Sheets

FIG.1

| User ID | IP address | Setting function | ID of number device | Password |
|---|---|---|---|---|
| User 1 | □□□ | ACD function call pick up | 123···9 | ABCDE |
| User 2 | ○○○○ | Call forward multi-apearance | 32···8 | XYZCAB |
| ............ | ............ | ............ | ............ | ............ |
| User m | ×××× | ACD function | 3372···1 | DFB···X |

CONTROL PROGRAM PROVIDING METHOD USING COMMUNICATION SYSTEM, CENTER APPARATUS IN COMMUNICATION SYSTEM, USER APPARATUS IN COMMUNICATION SYSTEM, AND PROGRAM RECORDED ON RECORDING MEDIUM IN USER APPARATUS

CROSS-REFERENCE TO RELATED APPLICATIONS

This is a divisional of application Ser. No. 10/855,388, filed May 28, 2004 now U.S. Pat. No. 7,801,291, currently pending, which is incorporated by reference herein in its entirety. This application is based upon and claims the benefit of priority from prior Japanese Patent Application No. 2003-155935, filed May 30, 2003, the entire contents of which are incorporated herein by reference.

BACKGROUND OF THE INVENTION

1. Field of the Invention

The present invention relates to a control program distributing method which distributes a control program from a center apparatus as a communication equipment manufacturer that manufacturers communication equipment, such as private branch exchanges and button telephone sets, to a user having communication equipment through the use of a communication system and sets the control program in the communication equipment of the user, a center apparatus that provides transmission control of the control program, a user apparatus provided with the communication equipment, and a program recorded on a recording medium in the user apparatus.

2. Description of the Related Art

In offices, schools, business places, and so on, a large number of pieces of communication equipment, such as electronic private branch exchanges, button telephone sets, etc., is used. When purchasing these pieces of communication equipment, users will generally select communication equipment having functions required at that time built in.

After commencement of use of such communication equipment, however, it sometimes becomes necessary to makes additions to the functions of communication equipment according to augmentation of the staff, changing of the range of business, or the like or to remove unnecessary functions. In such a case, according to a conventional practice, the user will request manufacturer's customer center to make additions to the functions of communication equipment. Accordingly, a customer engineer will travel on business to the place where the communication equipment is installed to perform there the work of adding desired functions to the communication equipment.

With such a method, however, the greater part of the work from acceptance of the request made by the user for changing the functions until the functions are changed depends on the human work by the customer engineer; thus, it takes a lot of time and labor from when a request is made by the user for changing the functions until changing of the functions is completed.

In recent years, a system has been proposed which distributes a control program to communication equipment over a communication network to allow it to perform arbitrary functions (Jpn. Pat. Appln. KOKAI Publication No. 2003-087422). According to this system, additions or changes to the functions of communication equipment can be made without the need for a manufacturer's customer engineer to go to the place where the communication equipment is installed.

With this system, however, a programmer in the communication equipment manufacturer has to prepare a control program to meet the user's requirements. However, since the environmental requirements vary from user to user, the preparation of the control program requires investigation of the user and consideration of the setting environment of the communication equipment. This takes a lot of time and involves a high cost. Further, the burden on the programmer is great; that is, the programmer is required of experience and expert knowledge.

On the other hand, the user will need expert knowledge to understand the contents of the control program distributed from the communication equipment manufacturer and consequently take a lot of time and labor to set the control program in the communication equipment.

BRIEF SUMMARY OF THE INVENTION

It is therefore an object of the present invention to provide a control program providing method using a communication system, a center apparatus in the communication system, a user apparatus in the communication system, and a program recorded on a recording medium in the user apparatus, which allow function setting for each user to be performed quickly and appropriately, thereby allowing the cost on the user side to be reduced, the work of function setting to be lightened, the time required for function setting to be reduced, and the cost and labor in the center apparatus of the communication equipment manufacturer to be lowered.

According to an aspect of the present invention, there is provided a method for used with a communication system including a user apparatus having communication equipment which is selectively set a control program performing arbitrary communication functions, and a center apparatus which is connected to the user apparatus via a communication network and performs function setting support work on the communication equipment, the center apparatus providing the control program to the user apparatus via the communication network, the user apparatus setting the control program in the communication equipment, comprising: creating process data which constitutes at least a portion of the control program and describes the execution contents of the communication functions, and parameter data which constitutes a different portion of the control program from the process data portion and is used to describe individual setting information of user in accordance with the process data, in the center apparatus; sending the process data and the parameter data from the center apparatus to the user apparatus via the communication network; receiving the process data and the parameter data from the center apparatus, then describing input individual setting information in the parameter data to create the control program, in the user apparatus; recording the resulting control program onto a recording medium; and reading the control program from the recording medium and setting the read control program in the communication equipment as requested by the user, in the user apparatus.

According to another aspect of the present invention, there is provided A center apparatus connected over a communication network to a user apparatus having communication equipment which is selectively set a control program performing arbitrary communication functions, comprising: a creator which creates process data which constitutes at least a portion of the control program and describes the execution contents of the communication functions, and parameter data which constitutes a different portion of the control program from the process data portion and is used to describe individual setting information of user in accordance with the process data; and a transmitter which transmits the process data and the parameter data to the user apparatus via the communication network, to cause the user apparatus to describe individual setting information in the parameter data.

According to yet another aspect of the present invention, there is provided A user apparatus having communication equipment which is selectively set a control program performing arbitrary communication functions, and connected via a communication network to a center apparatus which performs function setting support work for the communication equipment, comprising: a receiver which receives process data which constitutes at least a portion of the control program and describes the execution contents of the communication functions, and parameter data which constitutes a different portion of the control program from the process data portion and is used to describe individual setting information of user in accordance with the process data, sent from the center apparatus via the communication network; a creator which creates the control program by describing input individual setting information in the parameter data and records the resulting control program onto a recording medium, when the receiver receives the process data and the parameter data from the center apparatus; and a controller which controls to read the control program from the recording medium and sets the read control program in the communication equipment as requested by the user.

According to yet another aspect of the present invention, there is provided a program recorded on a recording medium in a user apparatus having communication equipment capable of performing arbitrary communication functions and connected through a communication network to a center apparatus which performs function setting support work on the communication, equipment, and including process data in which the execution contents of the communication functions have been described and parameter data in which individual setting information that varies from user to user is to be described, comprising: means for instructing the user apparatus to describe the individual setting information in the parameter data, when the individual setting information is entered; and means for instructing the user apparatus to perform communication functions described in the process data, when the individual setting information has been set in the parameter data and the process data and the parameter data have set in the communication equipment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described hereinafter with reference to the accompanying drawings.

First Embodiment

Figure 1:
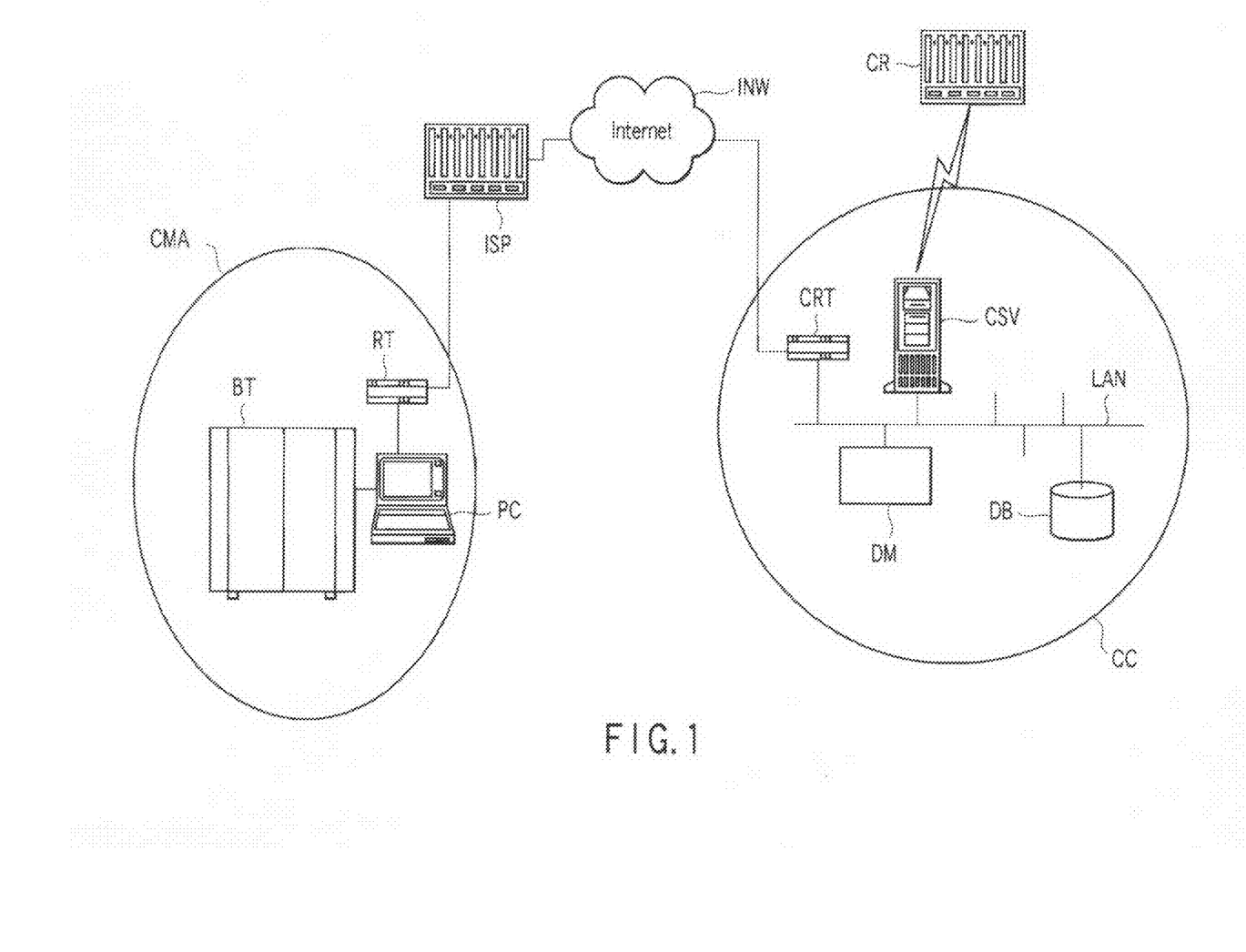
FIG. 1 is a schematic diagram showing a structure of a communication system for implementing a first embodiment of a control program distribution method of the present invention.

FIG. 1 is a schematic representation of a communication system for implementing a first embodiment of a control program distribution method of the present invention. In this diagram, CMA indicates a user system, CC indicates the service center of an exchange manufacturer, and CR indicates a credit company.

The user system CMA is equipped with a main apparatus BT, a personal computer PC and a router RT. The main function of the main apparatus BT is to interconnect telephone terminals (not shown) and interconnect these telephone terminals and the subscribers' lines of the public telephone network not shown. In addition to this main function, the main apparatus BT has a plurality of optional service functions associated with the interconnection (switching) processing.

The router RT is connected through a provider ISP to the Internet INW to which the service center CC is connected.

The service center CC is equipped with a control server CSV, a user database DB, a router CRT, a data storage unit DM, which are interconnected by a LAN. The control server CSV is connected through the router CRT to the Internet INW to communicate with the user system CMA under contract regarding function setting. The control server CSV is connected with the credit company DR by, for example, a private line to settle accounts with the credit company CR for the charge for function setting.

Figure 2:
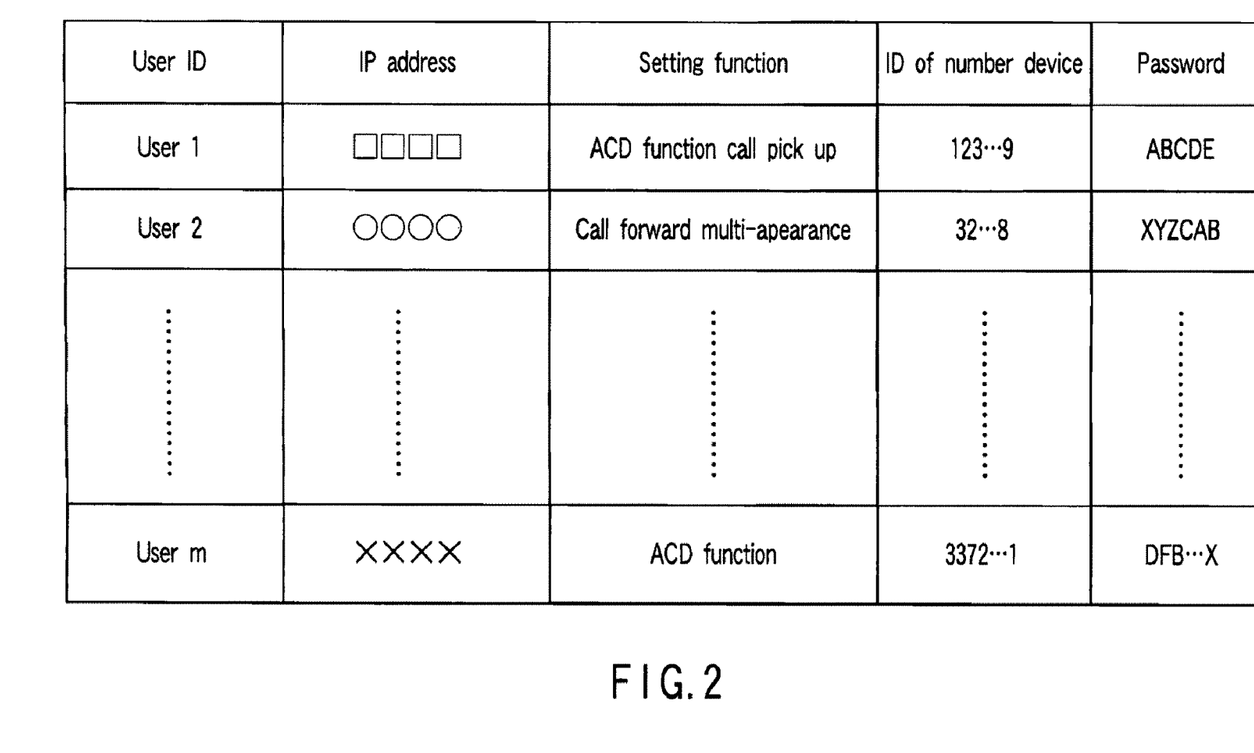
FIG. 2 is a diagram showing a stored contents of a user database.

In the user database DB, as shown in FIG. 2, an identification number (user ID), an IP address, set functions of the main apparatus BT (including functions that can be set), an equipment identification number as private information and a password as authentication information are allocated for each user and stored in the form of a table.

Figure 3:
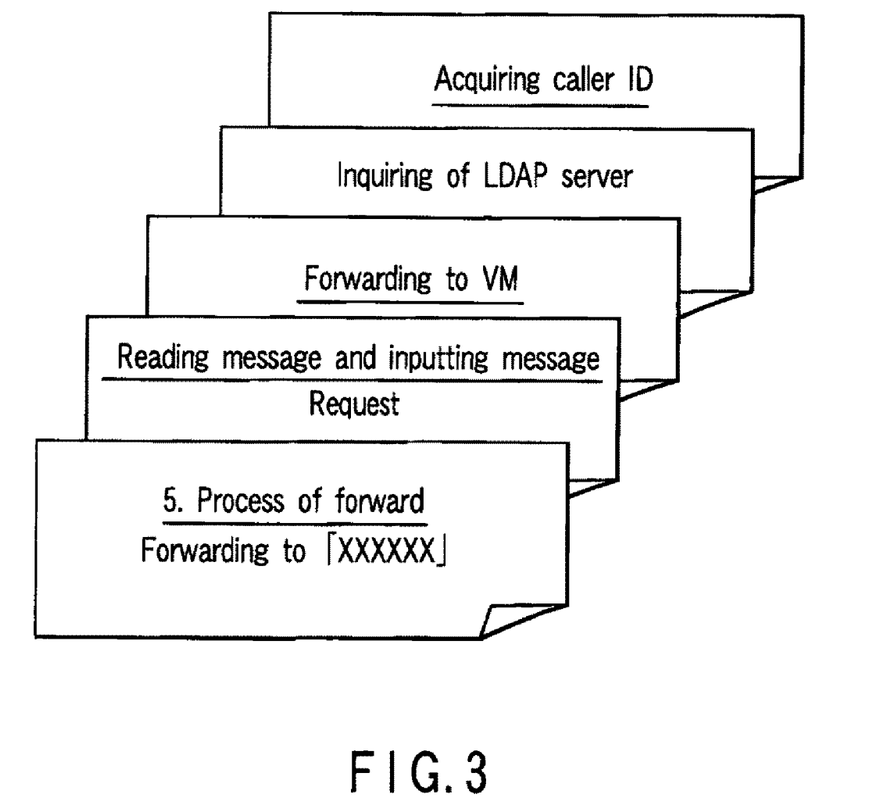
FIG. 3 is a diagram showing a stored contents of a data storage unit.

In the data storage unit DM, various pieces of process data that describe the contents of exchange control in the user's main apparatus BT are stored as shown in HG. 3.

Figure 4:
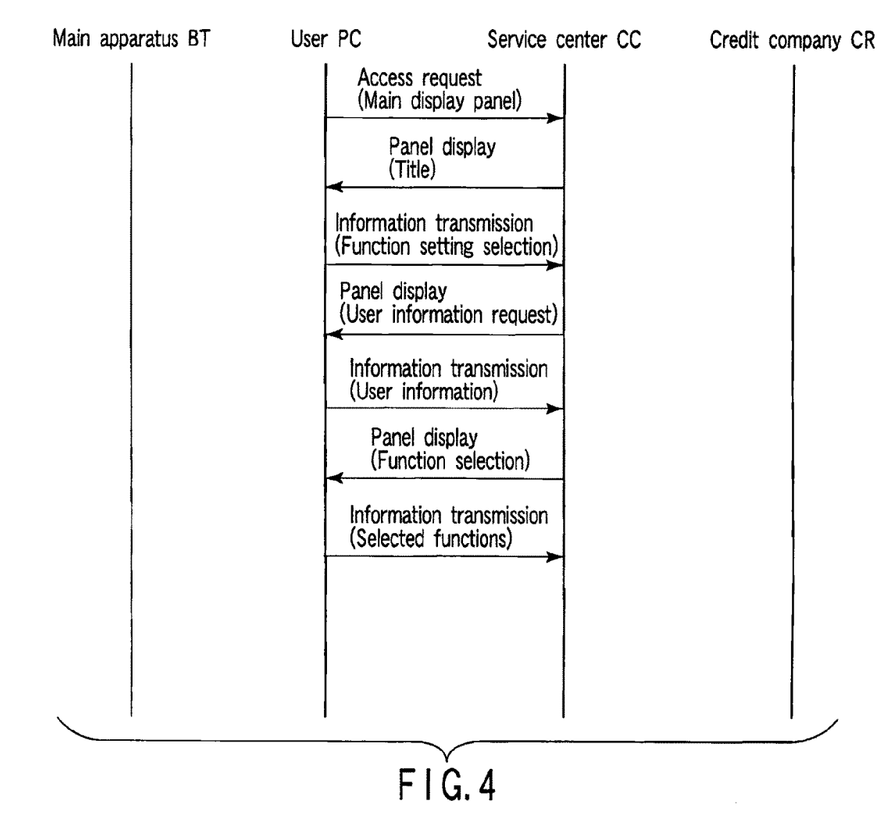
FIG. 4 is a diagram showing a sequence of transmit and receive operations among the main apparatus BT and the personal computer PC in the user system CMA, the service center CC, and the credit company CR.
Figure 5:
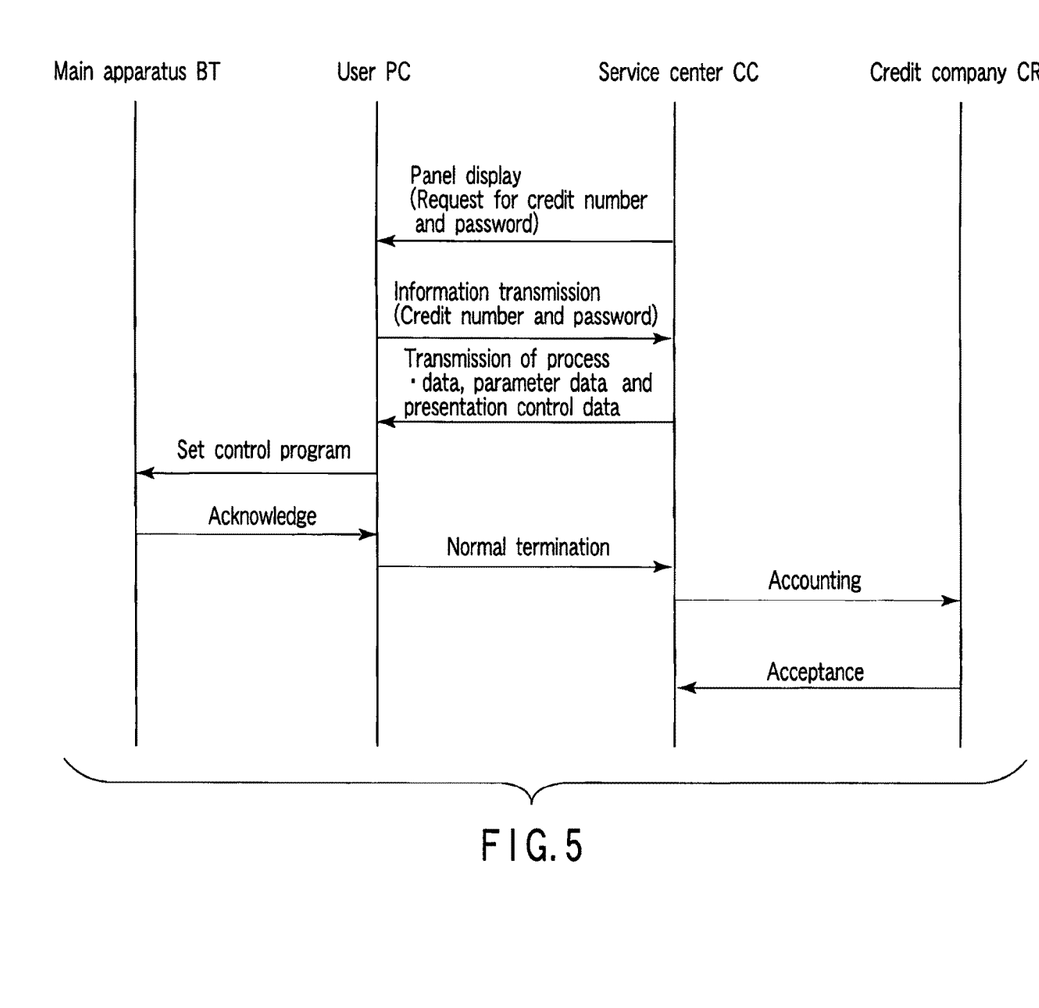
FIG. 5 is a diagram showing a sequence of transmit and receive operations among the main apparatus BT and the personal computer PC in the user system CMA, the service center CC, and the credit company CR.

FIGS. 4 and 5 illustrate a sequence of transmit and receive operations among the main apparatus BT and the personal computer PC in the user system CMA, the service center CC, and the credit company CR.

In function setting of the main apparatus BT, the user makes access to the service center CC over the Internet INW using the personal computer PC and enters necessary items associated with the function setting according to information on a screen downloaded from the service center CC. The necessary items to be entered are information indicating functions to be set and the user ID. Upon termination of entry of the necessary items, a function acquisition request containing these information is sent to the service center CC over the Internet INW.

Upon receiving the function acquisition request, the service center CC sends to the personal computer PC a request to enter the credit number and the password for authentication. In response to the entry request, the user enters the credit number and the password through the use of the personal computer PC, whereupon the personal computer PC sends these input information to the service center CC.

The service center CC determines the validity of the user on the basis of the user's password and, if there is no problem, makes a comparison between the functional information contained in the function acquisition request and the set function information stored in the user database DB to make a decision of whether or not functions that the user desires to acquire can be set. If the functions can be set, then the service center CC reads the corresponding process data from the data storage unit DM and creates parameter data for describing individual setting information that varies from user to user according to the process data and presentation control data (support tool) that allows the process data and parameter data to be displayed in script form. The process data, the parameter data and the presentation control data are then sent to the requesting personal computer PC. At this point, the process data, the parameter data and the presentation control data are enciphered using the function identification number retained in the user database DB as private information.

Upon receipt of the process data, the parameter data and the presentation control data from the service center CC, the personal computer PC deciphers them using the equipment identification number allocated to itself and then displays the process data and the parameter data on a monitor (not shown) in script form in accordance with the presentation control data. When the user terminates entry of individual setting information to fill in the blanks in the parameter data displayed on the monitor, a control program is prepared from the process data and the parameter data and then stored in a storage unit (not shown), such as a hard disk, a RAM, or the like. The control program is read from the storage unit and set in the main apparatus BT as requested by the user. Upon completion of setting of the control program, the personal computer PC returns to the service center CC a message to the effect that the function setting process has terminated normally.

Upon receipt of the termination message, the service center CC accesses the credit company CR to make a request to bill the charge for function setting. At this point, the service center CC calculates the charge for each function which the user wanted to set and which has been actually set and creates an electronic bill specification. This electronic bill specification is sent to the credit company CC in the form it is included in the bill request information.

Upon receipt of the bill request information, the credit company CR performs a process of accepting the bill request on the basis of the user's credit number and the electronic bill specification included in the bill request information. Upon termination of acceptance of the bill request, the credit company CR returns to the requesting service center CC sends an acknowledgement that the bill request has been accepted.

Figure 6:
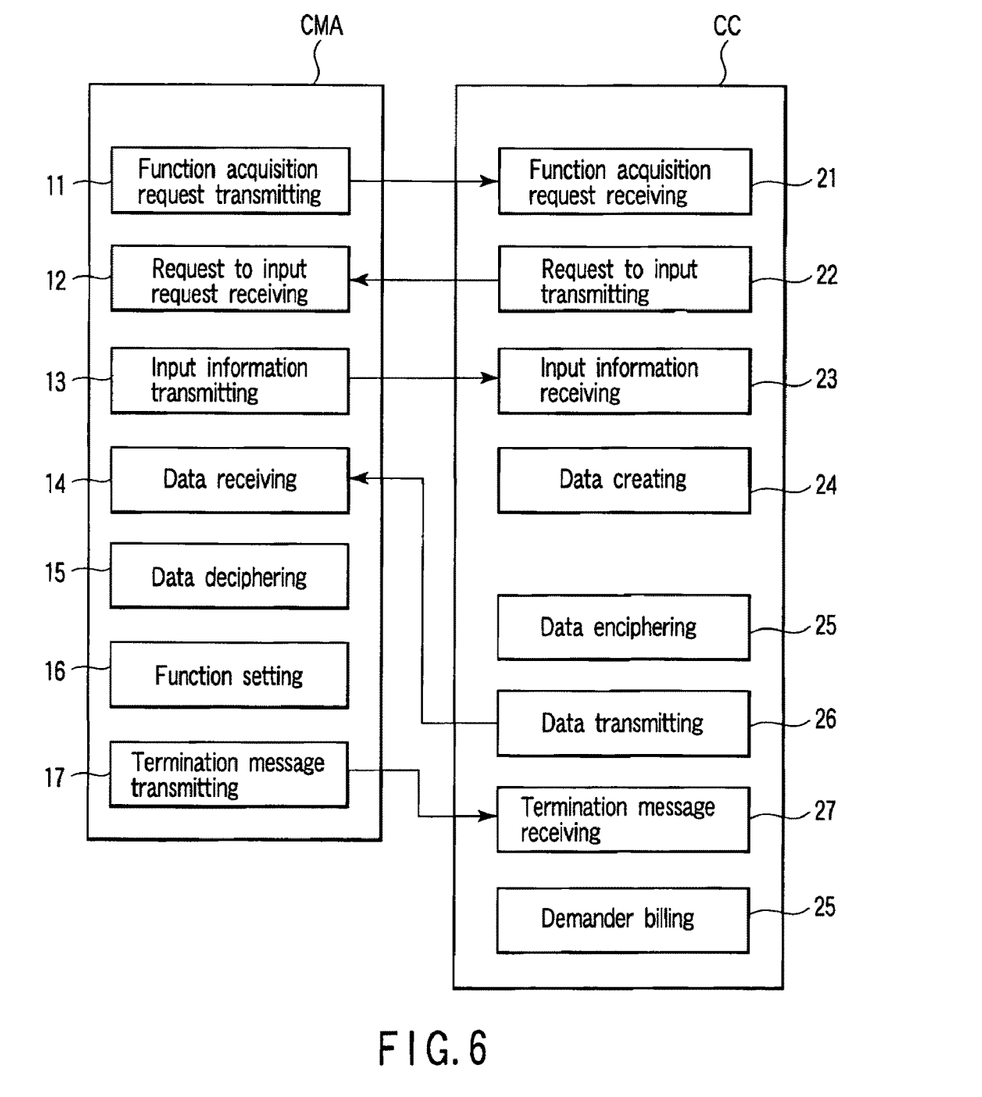
FIG. 6 is a functional block diagram of the personal computer PC in the user system CMA and the service center CC.

FIG. 6 is a functional block diagram of the personal computer PC in the user system CMA and the service center CC.

The personal computer PC in the user system CM is provided with a request transmitting section 11, a request receiving section 12, an information transmitting section 13, a data receiving section 14, a data deciphering section 15, a function setting section 6, and a message sending section 17. The request transmitting section 11 sends information concerning functions the user desires to acquire and a function acquisition request containing the user ID to the service center CC.

The request receiving section 12 receives a request to input the credit number and the password which is sent from the service center CC in response to the function acquisition request. When the user inputs the credit number and the password in response to the request-to-input, the information transmitting section 13 sends these input information to the service center CC.

The data receiving section 14 receives the process data, the parameter data, and the presentation control data sent from the service center CC. The data deciphering section 15 deciphers the received process data, parameter data, and presentation control data by using the equipment identification number assigned to itself.

The function setting section 16 creates a control program when individual setting information from the user has been written in the parameter data and sets it in the main apparatus BT upon request. When the setting of the control program in the main apparatus BT is completed, the termination message presentation section 17 presents a message to that effect to the service providing section CC.

The control server CSV in the service center CC is provided with a request receiving section 21, a request-to-input sending section 22, an information receiving section 23, a data creating section 24, a data enciphering section 25, a data transmitting section 26, a message receiving section 27, and a billing section 28. The request receiving section 21 receives a request for function acquisition sent from the user system CMA. Upon receipt of the request for function acquisition, the request-to-input transmitting section 22 sends to the requesting user system CMA a request to input the credit number and the password. The information receiving section 23 receives the credit number and the password sent from the user in response to the request-to-input.

When the user is validated through the password, the data creating section 24 compares the function information contained in the function acquisition request and the function setting information in the user database DB to decide whether or not the function that the user desires to acquire can be set. If it is possible, the data creating section 24 reads corresponding process data from the data storage unit DM and then creates parameter data and presentation control data.

The data enciphering section 25 enciphers the process data, the parameter data, and the presentation control data on the basis of the equipment identification number assigned to the user for the purpose of transmission to the user system CMA. The data transmitting section 26 sends the process data, the parameter data, and the presentation control data thus enciphered to the user system CMA.

When the message receiving section 27 receives from the user system CMA a message that setting of the control program in the main apparatus BT has been completed, the billing section 28 performs an account (settlement) procedure in conjunction with the credit company CR on the basis of the user's credit number to draw the charge for creation of the process data, the parameter data, and the presentation control data and setting of functions from the user's bank account.

Figure 7:
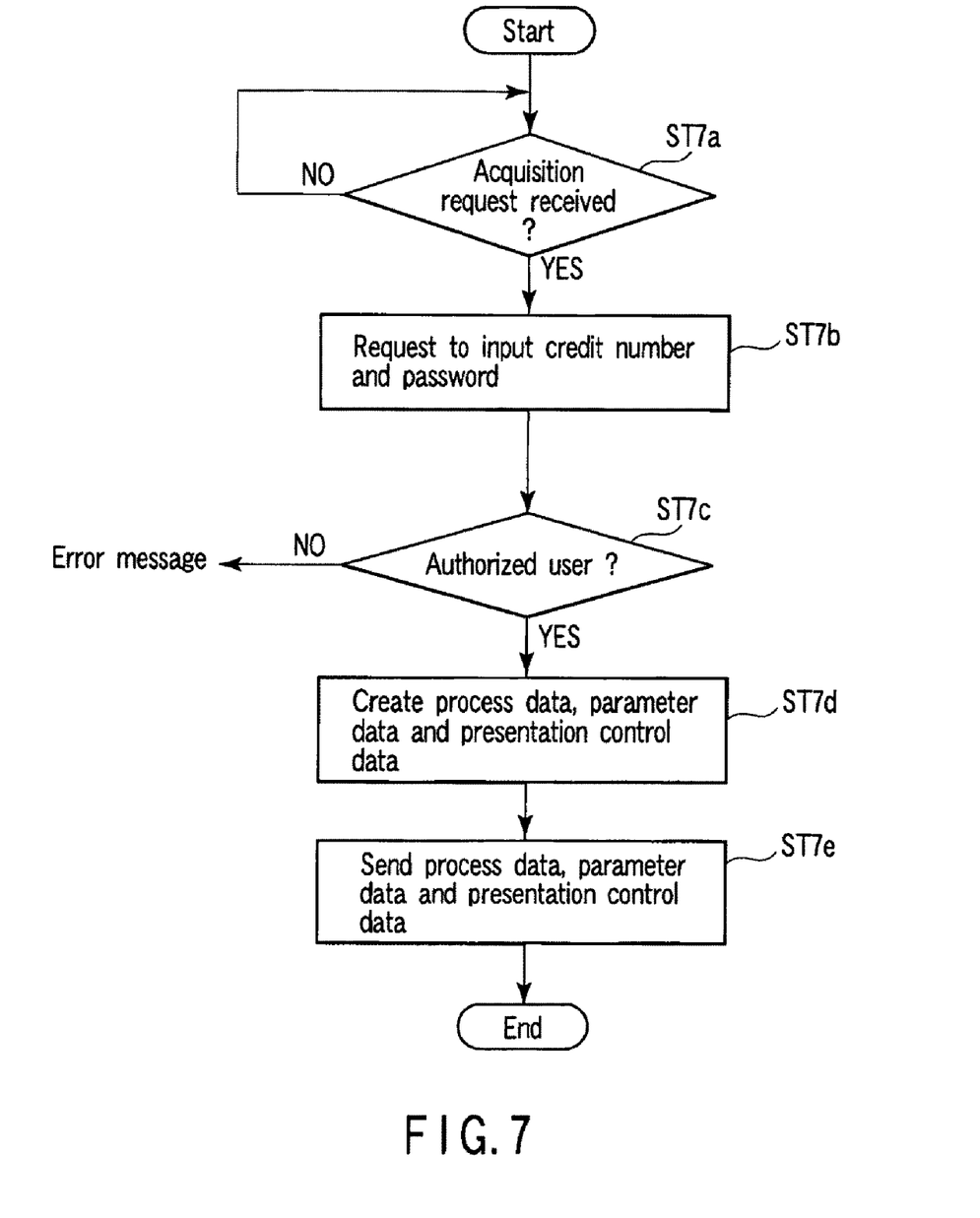
FIG. 7 is a flowchart showing the operation of the service center CC.

FIG. 7 is a flowchart illustrating the operation of the service center CC. The processing operation of providing a control program having functions that the user desires is carried out in accordance with the procedure shown in steps ST7a through ST7e.

The control server CSV in the service center CC monitors the arrival of a function acquisition request from the user system CMA (step ST7a). Upon arrival of the function acquisition request (YES in step ST7a), the control server CSV sends to the requesting user system CMA a request to input a credit number and a password (step ST7b) and then monitors their reception from the user system CMA (step ST7c). If a password arrives and this matches the password entered in the user database DB for the user (YES in step ST7c), the control server CSV reads process data for the corresponding functions from the data storage unit DM, then creates parameter data and presentation control data (step ST7d) and sends the process data, the parameter data, and the presentation control data to the requesting user system CMA (step ST7e).

Figure 8:
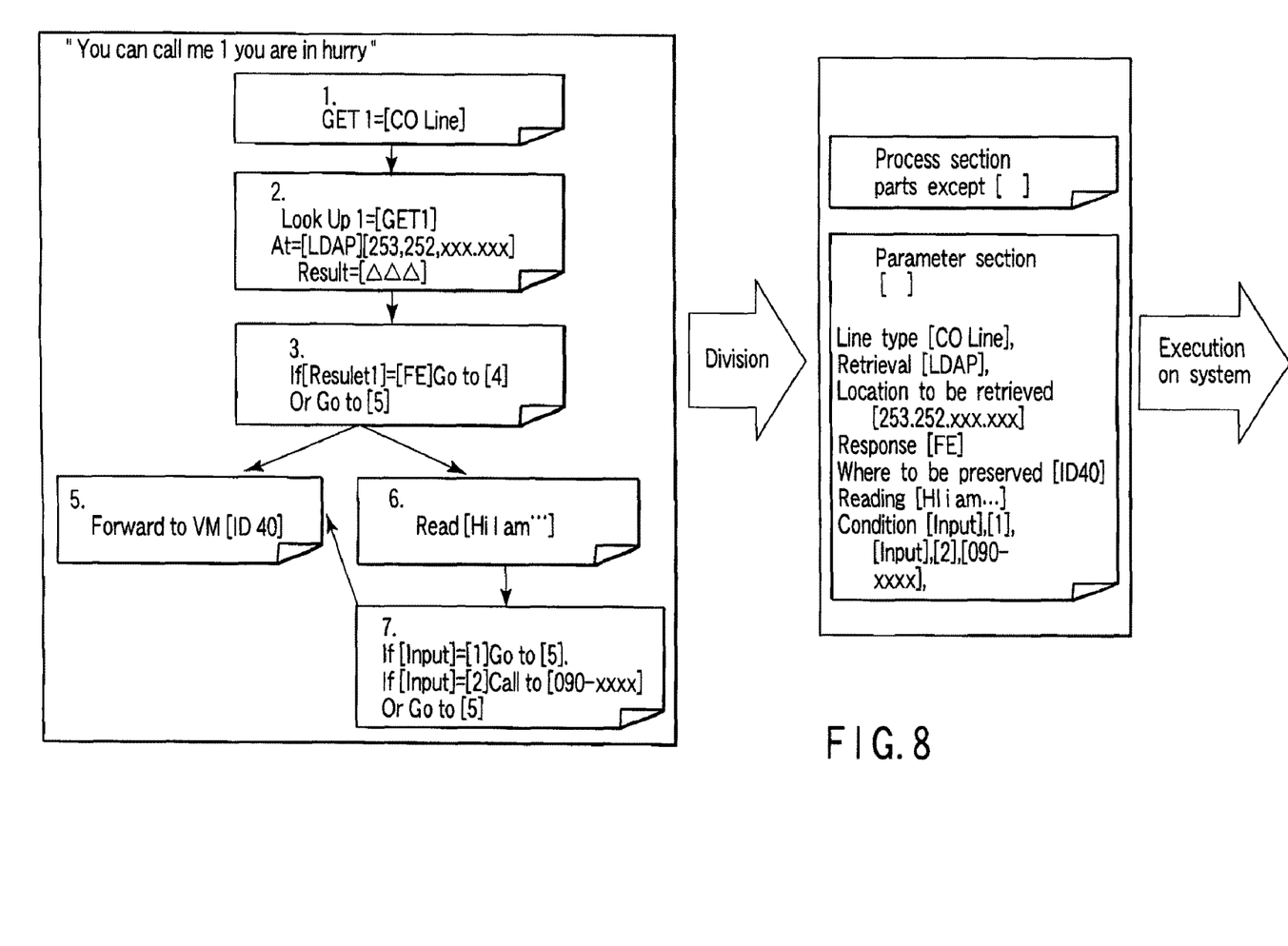
FIG. 8 is a diagram showing a structure of the control program.

Thus, as shown in FIG. 8, the user system CM is supplied with the process data and the parameter data division-produced from a control program (call control instructions) which is to carry out an exchange control process.

If, on the other hand, a credit number and a password do not arrive within a fixed length of time or an incoming password does not match any one of the passwords entered in the user database DB (NO in step ST7c), then the control server CSV notifies the requesting user system CMA that the password is in error or it is not allowed to provide the process data, the parameter data and the presentation control data. In the absence of the corresponding process data in the data storage unit DM in step ST7d, process data corresponding to functions the user desires are created anew.

Figure 9:
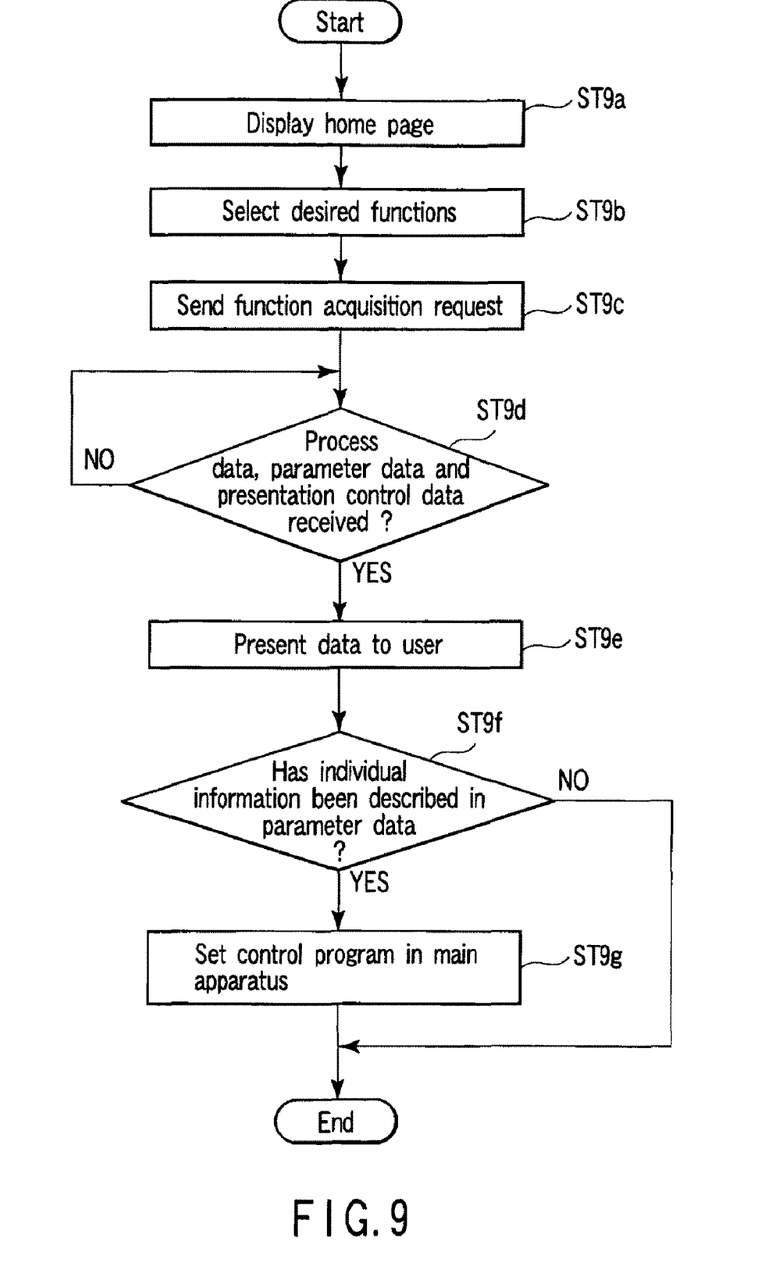
FIG. 9 is a flowchart showing a procedure carried out by the personal computer PC in the user system CMA.

FIG. 9 is a flowchart illustrating a procedure carried out by the personal computer PC in the user system CMA.

To obtain the supply of a control program corresponding to desired functions, the user causes the personal computer PC to carry out the processes in steps ST9a to ST9g. First, the personal computer PC makes access to the home page of the service center CC to receive a selection screen (panel) (step ST9a). When the user clicks on the Function setting on this screen (step ST9a), the user is prompted to input the user ID and functions that he desires to acquire (step ST9c). Upon completion of entry, a function acquisition request containing the input information is sent to the service center CC.

Figure 10:
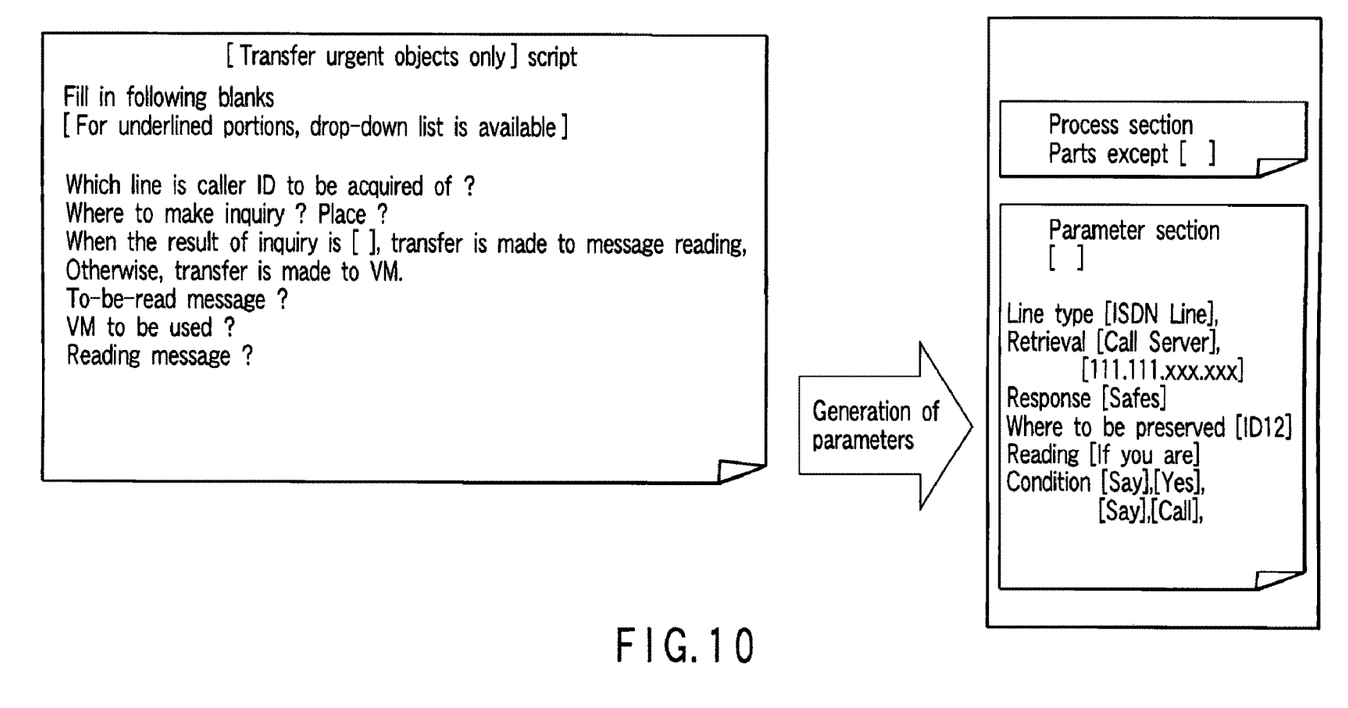
FIG. 10 is a view showing display the process data and the parameter data in script form.

The personal computer PC monitors the arrival of the process data, the parameter data, and the presentation control data in step ST9d. Upon receipt of these data from the service processing center CC, the personal computer PC displays the process data and the parameter data in script form as shown in FIG. 10 (step ST9e). The user is thus allowed to enter individual setting information, such as telephone numbers/IP addresses, so that they are described in parameter data. The script may be displayed in Japanese or any other language (for example, English) as requested by the user.

Suppose here that the user has entered the individual setting information into the personal computer PC. Then, the personal computer PC goes from step ST9f to step ST9g, then combines the process data and the parameter data having the individual setting information described to create a control program and sets this control program in the main apparatus BT as needed.

Upon completion of setting of the control program in the main apparatus BT, the personal computer PC sends a setting completion message to the service center CC. If there is no need of setting the control program in the main apparatus BT at the time of creation in step ST9g, it is stored into a storage unit.

If the user performs other processing than entering individual setting information in step sT9f, then the personal computer PC terminates processing.

Figure 11:
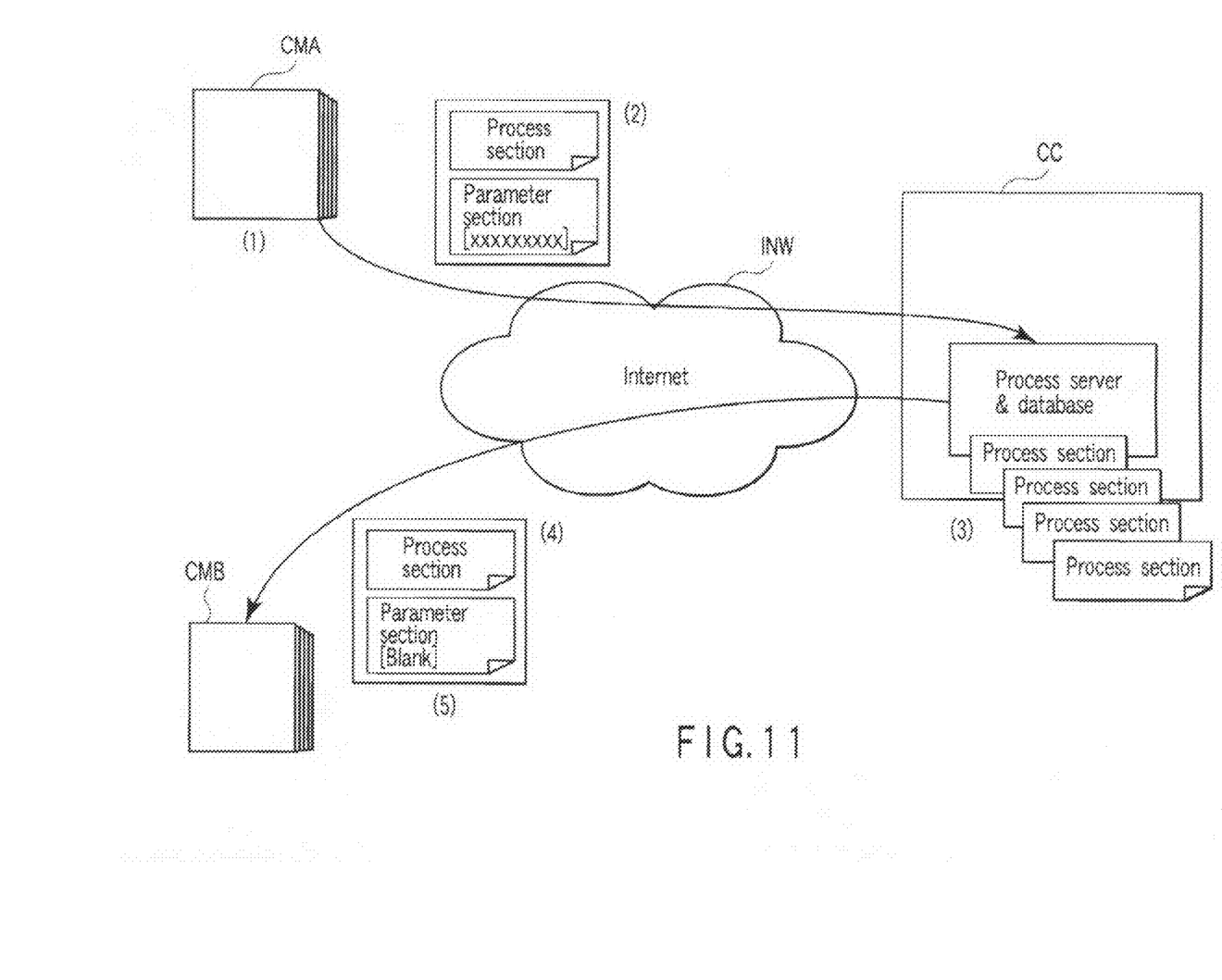
FIG. 11 is a view showing a procedure of purchasing process of control program.

The control program stored in the storage unit in the main apparatus BT is purchased by the service center CC, which is carried out in accordance with such a procedure as shown in FIG. 11.

That is, the user inquires of the service center CC over the Internet INW whether it will purchases the control program which has become unnecessary. If there is no objection to it, the service center CC sends to the user system CMA from which the inquiry originated over the Internet INW a request to send the unnecessary control program. Upon receipt of this request to send, the personal computer PC reads the corresponding control program from the storage unit in the main apparatus BT and then sends it to the service center CC over the Internet INW.

Upon receipt of the control program, the service center CC divides the control program into the process data and the parameter data, then stores the process data into the data storage unit DM and eliminates the individual setting information from the parameter data.

Figure 12:
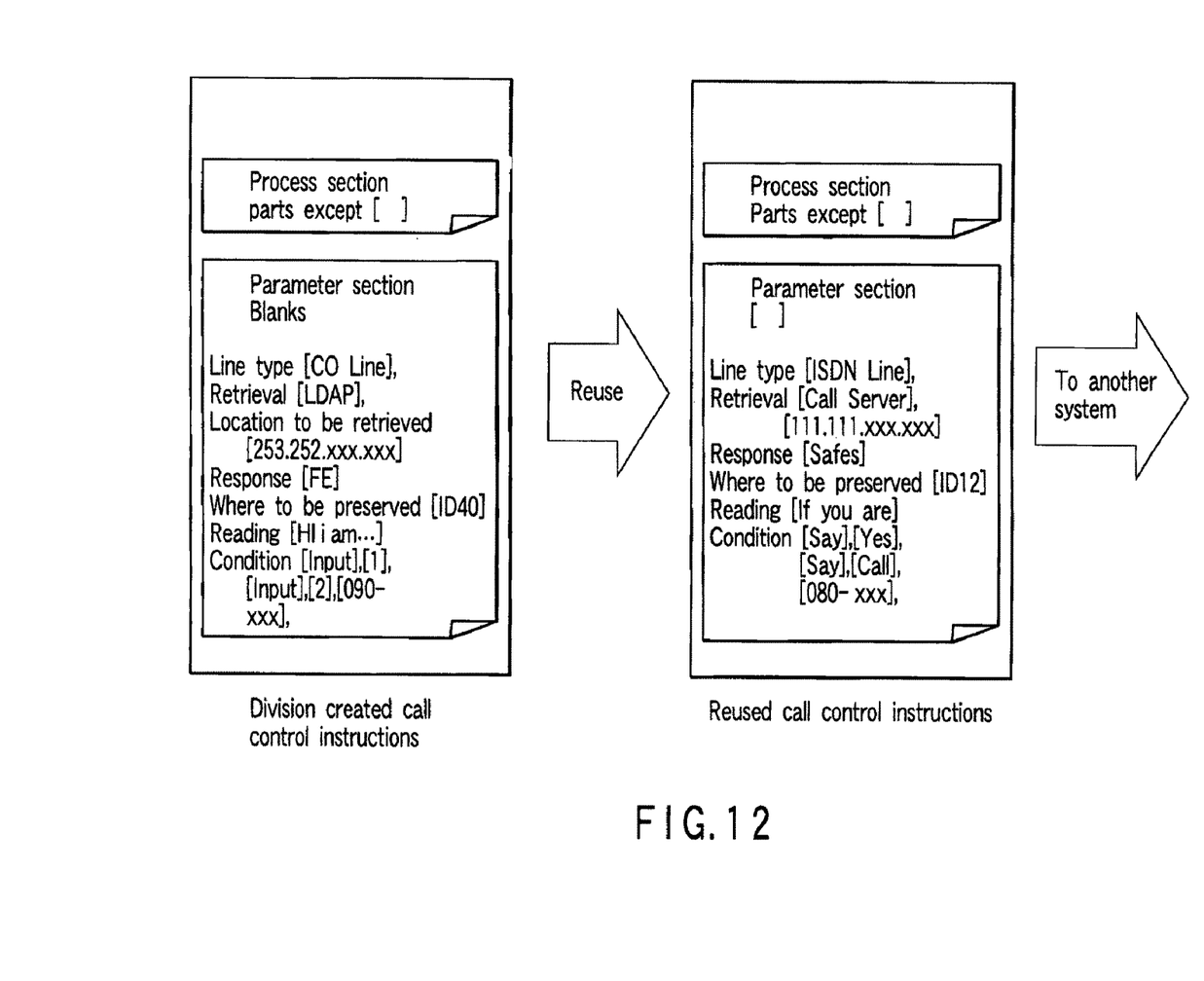
FIG. 12 is a diagram showing a procedure in which the service center CC purchases a control program stored in the storage unit in the main apparatus BT in accordance with a first embodiment of the present invention.

The purchased process data will be provided to another user system CMB that demands a control program (call control instructions) similar to the main apparatus BT in the user system CMA. In the user system CMB, the process data thus provided will be utilized as it is and only individual setting information will be described in the parameter data as shown in FIG. 12.

According to the embodiment, as described above, in carrying out function setting control of the main apparatus BT for each user, the user system CMA sends information concerning functions the user desires to acquire and a function acquisition request containing the user ID to the service center CC. In response to this, the service center CC creates process data in which the contents of the functions are described and parameter data in which individual setting information is to be described for each user and then sends them to the requesting user system CMA over the Internet INW. The user system CMA creates a control program to be set in the main apparatus BT by describing individual setting information in the parameter data.

Therefore, the service center CC is allowed to share in the control program creation processing with the user system CMA. This allows the user to perform the function setting in the main apparatus BT within a short length of time and at low cost and the center to significantly reduce labor and cost required for function setting.

Furthermore, in the first embodiment, in the user system CMA, process data and parameter data are displayed on the monitor of the personal computer PC each time they are received from the service center CC. The user fills in the blanks in the displayed parameter data with individual setting information, such as telephone numbers/IP addresses, to create a control program and sets this control program in the main apparatus BT. Therefore, even if the control program is one to carry out functions that the user desires to acquire, the user does not have to set it in the main apparatus VT when there is no need at present to set it in the main apparatus BT. Moreover, since the process data and the parameter data are displayed in script form on the monitor of the personal computer PC, the user simply enters individual setting information into the parameter data through screens easy to see and understand. Thus, the labor and time required to create the control program can be reduced and any user is allowed to create the control program through simple operations.

In addition, in the service center CC, a decision is made as to whether or not functions can be set in the main apparatus BT through the use of the set function information stored and managed in the user database DB; thus, an appropriate function setting process can be carried out using a simple procedure.

In the first embodiment, the settlement of the account for the creation of process data, parameter data and presentation control data and the setting of functions can be performed automatically between the service center CC and the credit company CC over the communication network on the basis of the credit number sent from the user. Thus, the work of account on the side of the service center CC can be lightened.

Also, in the first embodiment, when the process data, the parameter data and the presentation control data are sent from the service center CC to the user system CMA, they are enciphered using the user's equipment identification number previously entered into the user database DB. For this reason, it becomes possible to prevent false or unauthorized function setting even in case of erroneous transmission of process data, parameter data and presentation control data to a different user system or the theft of these data addressed to a different user system by a third party.

In addition, in the first embodiment, prior to transmission of the process data, the parameter data and the presentation control data, the user's password entered, into the user database DB in the service center CC is utilized to verify the identity of the user. Thus, the validity of the user can be confirmed with certainty prior to transmission of the process data, the parameter data and the presentation control data.

Furthermore, in the present embodiment, since the user can have the service center CC purchase a control program which was prepared by himself and has become unnecessary, he can get the money corresponding to the contents and evaluation of the control program. This will give the user an additional incentive to control program creation. For the service center CC, on the other hand, since the control program purchased from the user can be utilized to create process data and parameter data for another user, the processing load can be reduced correspondingly and the number of subscribers to the communication system is expected to increase.

Second Embodiment

Figure 13:
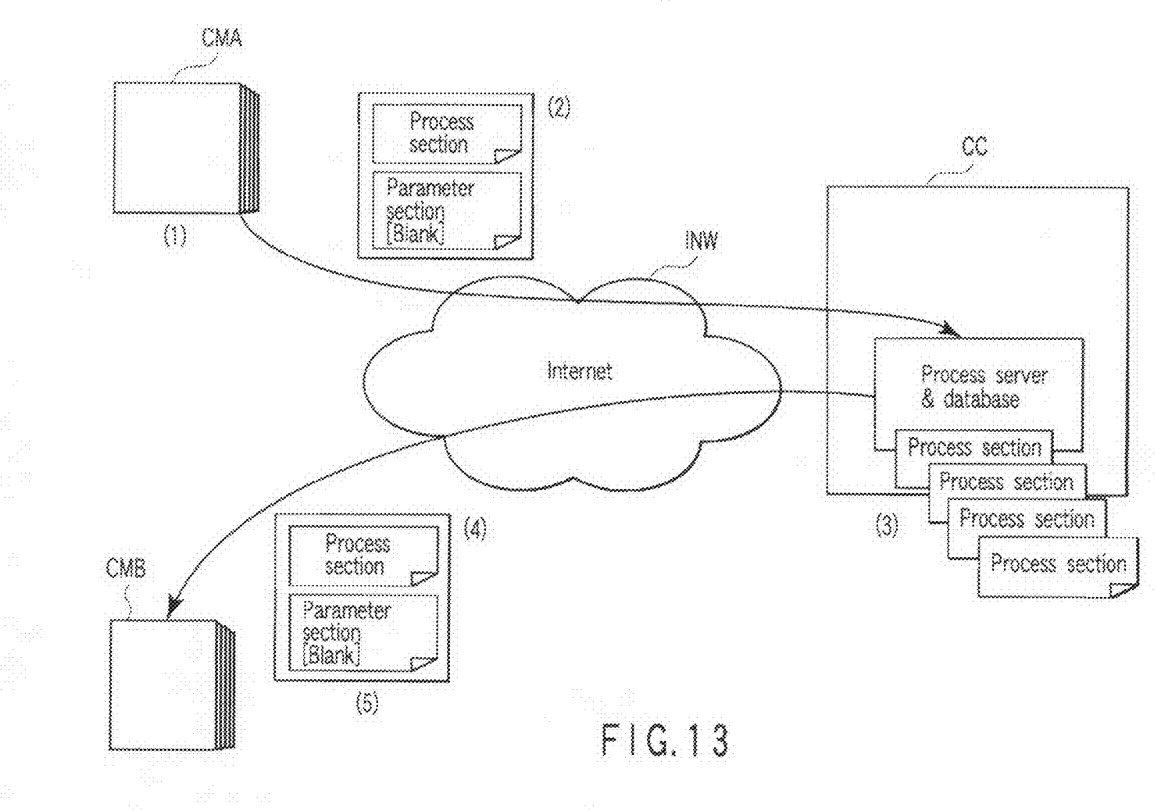
FIG. 13 is a diagram showing a procedure in which the service center CC purchases a control program stored in the storage unit in the main apparatus BT in accordance with a second embodiment of the present invention.

FIG. 13 shows a procedure in which the service center CC purchases a control program stored in the storage unit in the main apparatus BT in accordance with a second embodiment of the present invention.

That is, the user inquires of the service center CC over the Internet INW whether it will purchase the control program which has become unnecessary. If there is no objection to it, the service center CC sends to the user system CMA from which the inquiry originated over the Internet INW a request to send the unnecessary control program. Upon receipt of this request to send, the personal computer PC reads the corresponding control program from the storage unit in the main apparatus BT, then divides the control program into process data and parameter data and eliminates individual setting information in the parameter data. After that, the control program is sent to the service center CC over the Internet INW.

Upon receipt of the control program, the service center CC divides the control program into the process data and the parameter data and then stores the process data into the data storage unit DM.

The purchased process data will be provided to another user system CMB that demands a control program (call control instructions) similar to the main apparatus BT in the user system CMA. In the user system CMB, the process data thus provided will be utilized as it is and only individual setting information will be described in the parameter data.

According to the second embodiment, as described above, the control program is sent to the service center CC after the individual setting information in the parameter data has been removed by the user, allowing the privacy protection to be strengthened.

Other Embodiments

The present invention is not limited to the embodiments described so far. For example, in the embodiments, the service center sends process data, parameter data and presentation control data over the Internet INW to the user system CMA which has made a contract in advance in order to perform functions the user desires to acquire; however, this is not restrictive. The process data, the parameter data and the presentation control data may be sent as requested by a user having no contract. In this case, the request may be received from the user by telephone, facsimile, or mail.

Although the embodiments have been described as the service center sending process data, parameter data and presentation control data to a user system as requested by the user, this is not restrictive. Process data, parameter data and presentation control data may be sent to the user each time the version of setting function information entered in the user database DB is updated.

In the embodiments, each time process data, parameter data and presentation control data is received, the user system displays the process data and the parameter data in script form and prompts the user to fill in the blanks in the parameter data with individual setting information. This is not restrictive. The individual setting information may be previously entered in the storage unit in the main apparatus BT or the personal computer PC. In this case, at the time when process data and parameter data are received, the individual setting information may be read from the storage unit and automatically described in the parameter data. This eliminates the need for the user to create a control program with manual processing; that is, the control program can be created automatically using the previously stored individual setting information.

Although the embodiments have been described as the user inquiring whether or not the service center CC will purchase a unnecessary control program, the service center CC may inquire of each user as to whether he or she has an unnecessary control program every week or month.

Although, in the embodiments, the credit number is sent from the user before process data and parameter data are received, this is not restrictive. The credit number may be stored in the user database DB in such a way that it is associated with the user ID. In this case, the credit number can be read from the user database DB on the basis of the user ID sent from the user. The user's credit number need merely be sent only when user information is entered in the user database DB. This will eliminate the anxiety that someone may steal a glance at the credit number over the communication network, resulting in increased security.

Although the embodiments have been described in terms of an example of enciphering process data, parameter data and presentation control data using an equipment identification number assigned to the user, this is not restrictive. Use may be made of private information other than the equipment identification number presented to the user from the service center CC. In this case, the service center CC would present the private information to the user by telephone or mail.

Additionally, the control program creation and distribution procedure, the communication system configuration, the contents of the user database, and the type of the communication equipment (main apparatus) can be modified variously without departing from the spirit or scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A center apparatus connected over a communication network to a user apparatus having communication equipment which is selectively set by a control program performing arbitrary communication functions, comprising:
    a creator which creates process data which constitutes at least a portion of the control program and describes the execution contents of the communication functions and a call control process related to an interconnection of telephone terminals, and parameter data which constitutes a different portion of the control program from the process data portion and is used to describe individual setting information of user in accordance with the process data,
    wherein the communication equipment is a telephone exchange apparatus which carries out the call control process; and
    a transmitter which transmits the process data and the parameter data to the user apparatus via the communication network to cause the user apparatus to present the process data and the parameter data to the user and to describe individual setting information in the parameter data.

2. The center apparatus according to claim 1, further comprising a receiver which receives a request including function information representing functions that the user desires to acquire and subscriber information assigned to the user apparatus by the communication network,
    wherein the creator creates the process data and the parameter data based on the function information, and the transmitter transmits the process data and the parameter data to the user apparatus via the communication network, based on the subscriber information.

3. The center apparatus according to claim 1, further comprising:
    a database which stores a subscriber information assigned to the user apparatus by the communication network, and function information representing the functions of the communication equipment in such a way that they are made to correspond to individual identification information previously assigned to the user; and
    a receiver which receives a request including a contents of changes to functions and the individual identification information,
    wherein the creator reads corresponding function information from the database based on the individual identification information, and creates the process data and the parameter data based on the read function information and the contents of changes to functions included in the request, and the transmitter reads the corresponding subscriber information from the database based on the individual identification information included the request and then transmits the process data and the parameter data via the communication network to the user apparatus based on the subscriber information.

4. The center apparatus according to claim 3, wherein the database stores authentication information for providing authentication of the user apparatus to correspond to the individual identification information, and
    the transmitter requests the requesting user apparatus to send the authentication information prior to transmission of the process data and the parameter data, then compares the authentication information sent from the user apparatus with the authentication information stored in the database and, when match occurs, transmits the process data and the parameter data to the user apparatus.

5. The center apparatus according to claim 1, wherein the transmitter enciphers the process data and the parameter data using a private information and then transmits the enciphered process and parameter data to the user apparatus, in response to the private information from the user.

6. The center apparatus according to claim 1, further comprising a purchaser which purchases the control program from the user apparatus, and wherein the creator divides the purchased control program into the process data and the parameter data, and eliminates individual setting information described in the parameter data.

7. The center apparatus according to claim 1, wherein the creator creates a presentation control data that allows the process data and the parameter data to be presented in script form as requested by the user, and the transmitter transmits the process data, the parameter data, and the presentation control data to the user apparatus via the communication network.

8. The center apparatus according to claim 1, wherein the contents of a call control process include acquiring caller ID, inquiring of LDAP server, forwarding to VM, reading message and inputting message, and process of forward.

9. The center apparatus according to claim 1, wherein the creator creates a presentation control data that allows the process data and the parameter data to be presented in script form as requested by the user, and the transmitter transmits the process data, the parameter data, and the presentation control data to the user apparatus via the communication network.

* * * * *